United States Patent [19]

Wilber et al.

[11] Patent Number: 5,739,638
[45] Date of Patent: Apr. 14, 1998

[54] BUS CONTROLLED ARRANGEMENT USING A DUTY CYCLE MODULATED CONTROL SIGNAL IN A CRT

[75] Inventors: James Albert Wilber, Indianapolis; Joseph Curt Stephens, Fishers, both of Ind.

[73] Assignee: Thomson Consumer Electronics, Inc., Indianapolis, Ind.

[21] Appl. No.: 668,962

[22] Filed: Jun. 24, 1996

[51] Int. Cl.⁶ .................................................. H04N 9/29
[52] U.S. Cl. ........................... 315/8; 315/370; 361/150
[58] Field of Search ........................... 315/8, 370, 85; 361/150; 348/820

[56] References Cited

U.S. PATENT DOCUMENTS

| | | | |
|---|---|---|---|
| 4,318,036 | 3/1982 | Bart et al. | 315/370 X |
| 4,752,722 | 6/1988 | Erratico et al. | 315/370 X |
| 5,015,915 | 5/1991 | Hartmann et al. | 315/8 |
| 5,170,094 | 12/1992 | Giannantonio et al. | 315/85 X |

OTHER PUBLICATIONS

SGS-Thomson Microelectronics, ST63140, ST63142, ST63126, ST63156—8-Bit HCMOS MCUs For TV Frequency & Voltage Synthesis With OSD, pp. 191–256, Oct. 1993.

*Primary Examiner*—Robert Pascal
*Assistant Examiner*—Justin P. Bettendorf
*Attorney, Agent, or Firm*—Joseph S. Tripoli; Joseph J. Laks; Sammy S. Henig

[57] ABSTRACT

A bus controlled pulse modulator receives a digitally coded signal and generates a pulse-width modulated signal. The pulse-width modulated signal is coupled to a base electrode of a non-committed or open collector transistor. The transistor switches with a controlled duty cycle. The collector of the transistor is coupled to an inverting input terminal of an amplifier via a resistor. The amplifier produces a compensation current in a tilt compensation coil. The voltage at the inverting input terminal is maintained constant in closed loop operation. The constant voltage produces a magnitude of a collector current in the transistor that is unaffected by the duty cycle of the pulse-width modulated signal. The compensation current thereby varies linearly with the duty cycle.

19 Claims, 1 Drawing Sheet

BUS CONTROLLED ARRANGEMENT USING A DUTY CYCLE MODULATED CONTROL SIGNAL IN A CRT

BACKGROUND

The invention relates to a bus controlled arrangement for a video apparatus. In particular, the invention relates to an arrangement for adjusting a current in a winding mounted on a cathode ray tube (CRT) to compensate for the earth's magnetic field.

U.S. Pat. No. 5,015,915, in the name of Hartmann et al., entitled METHOD OF COMPENSATING FOR THE EARTH'S MAGNETIC FIELD IN A PICTURE TUBE, describes an arrangement for compensating against the effect of the earth's magnetic field on a CRT using a remote control arrangement. A microprocessor applies a digitally coded signal to a digital-to-analog (D/A) converter. In the D/A converter, the digitally coded signal is first converted to a duty cycle modulated signal. The duty cycle modulated signal is applied to a switching transistor causing the transistor to have a controllable duty cycle.

A pull-up resistor and a low-pass filter are connected to the collector of the transistor. The low-pass filter produces a DC voltage in a filter capacitor from which voltage components at the switching frequency of the transistor are filtered out. The DC voltage has a magnitude that is determined, in accordance with the duty cycle of the transistor. The DC voltage is applied via a power amplifier to a compensation coil to produce a compensation current in the coil.

Typically, the switching transistor is included in an integrated circuit (IC). The transistor has a non-committed or open collector. The collector of the transistor is connected to an output pin of the IC. Advantageously, using the open collector transistor in the IC, eliminates the need to include in the IC an active pull-up transistor. Therefore, the circuitry of the IC is simplified. Furthermore, the use of the open collector transistor enables also utilizing the pin as an input pin. Advantageously, also using the pin as an input pin enables the microprocessor to sense a signal developed at the input/output pin for differentiating between a video display chassis in which the compensation circuit is installed and a chassis from which the compensation circuit is absent.

Typically, the filter capacitor of the low-pass filter is connected to the collector of the transistor via a resistor of the low-pass filter. Because the DC voltage in the filter capacitor is duty cycle dependent, the magnitude of the discharging current from the capacitor that flows via the resistor and the transistor is also duty cycle dependent. Thus, during a given cycle, the capacitor is discharged by an amount that is proportional to the length of the interval, during which the transistor is turned on, and to the capacitor voltage, that are both duty cycle dependent quantities. Therefore, the DC voltage in the capacitor is nonlinearly dependent on the duty cycle and on the digitally coded signal. In contrast, in linear operation, a change, for example, in a least significant bit of the digitally coded signal produces the same change in the compensation current, throughout the entire range of the duty cycle.

Disadvantageously, the nonlinear dependency causes the resolution of the D/A converter to be different at different portions of the range of the duty cycle. It may be desirable to maintain linearity throughout the entire duty cycle range. Otherwise, the resolution at a corresponding portion of the duty cycle rang may not be adequate.

SUMMARY

A video display apparatus, embodying an aspect of the invention, for controlling a beam landing location in a cathode ray tube, includes a transducer for producing a beam controlling field in the cathode ray tube. A transistor switch has a controllable duty cycle. An amplifier has an output coupled to the transducer for producing the beam controlling field. A feedback network is coupled to the output of the amplifier and to a first input of the amplifier for controlling an input voltage at the first input. A pull-up resistor is coupled to a non-committed, main current conducting terminal of the transistor switch and to the first input of the amplifier for applying the first input voltage. A toggling current is generated in the resistor having a duty cycle controlled by the transistor switch.

BRIEF DESCRIPTION OF THE DRAWING

The sole FIGURE illustrates a bus controlled Z-axis or tilt compensation arrangement, embodying an aspect of the invention, for a video display.

DESCRIPTION OF PREFERRED EMBODIMENT

Figure 1:
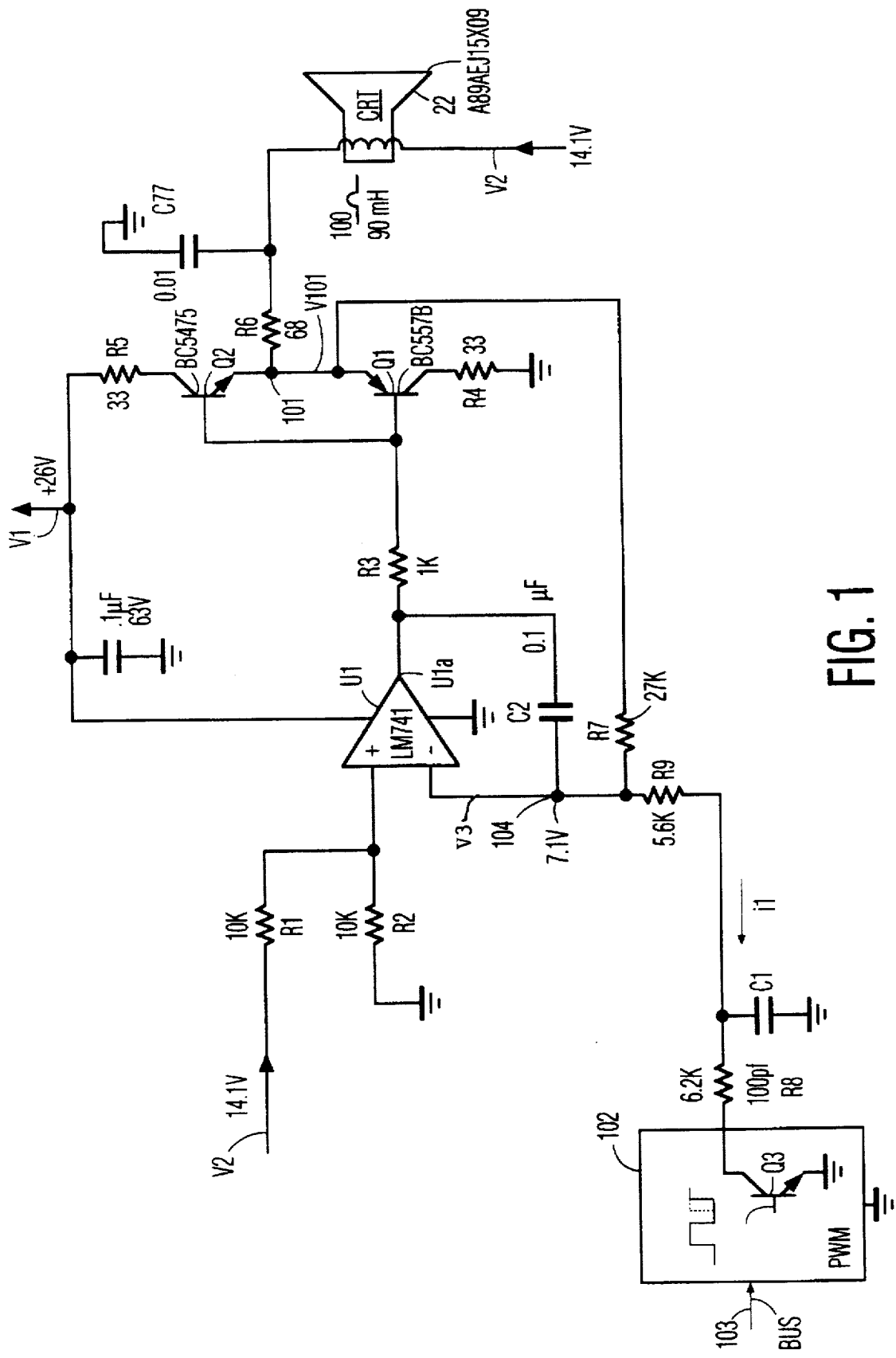

The sole FIGURE illustrates a bus controlled Z-axis or tilt compensation arrangement 100, embodying an aspect of the invention, for a video display. An operational amplifier U1 has a non-inverting input terminal coupled to a voltage divider formed by a resistor R1 coupled in series with a resistor R2. A voltage V2 is coupled across series coupled resistors R1 and R2. Thus, a voltage of one half of voltage V2 or 7.1V is developed at the non-inverting terminal.

An output terminal U1a of amplifier U1 is coupled via a protection resistor R3 to a base electrode of an emitter follower PNP transistor Q1 that is capable of sinking current at its emitter. Output terminal U1a is also coupled via resistor R3 to a base electrode of an emitter follower NPN transistor Q2 that is capable of sourcing current at its emitter. The collector electrode of transistor Q1 is coupled to a reference voltage or ground via a current limiting resistor R4. The collector electrode of transistor Q2 is coupled to a supply voltage V1 of amplifier U1 via a current limiting resistor R5.

A junction terminal 101, between the emitters of transistors Q1 and Q2, is coupled via a gain determining, negative feedback resistor R7 to an inverting input terminal 104 of amplifier U1. Terminal U1a of amplifier U1 is coupled via a filter, feedback capacitor C2 to inverting input terminal 104 of amplifier U1. Capacitor C2 filters out A/C components to prevent A/C components from appearing in a voltage V101 at terminal 101. Feedback resistor R7 causes a voltage V3 at inverting input terminal 104 to be equal to that at the non-inverting input terminal or 7.1V.

Junction terminal 101, between the emitters of transistors Q1 and Q2, is coupled to an end terminal of a series arrangement of a resistor R6 and a compensation coil W1. Coil W1 acts as a transducer for producing a field in a vicinity of a beam in a CRT 22. The operation of coil W1 for compensating the earth's magnetic field is well known, as described in the Hartmann et al., patent. A second end terminal of coil W1 is coupled to supply voltage V2 that is approximately one half of supply voltage V1.

When a voltage V101 at terminal 101 is more positive than voltage V2, a current iW1 in coil W1 is positive. Conversely, when voltage V101 is less positive than voltage V2, current iW1 in coil W1 is negative. Therefore, the two polarities of current iW1 are obtained using supply voltages V1 and V2 that are both positive voltages.

A conventional bus controlled pulse modulator 102 receives a digitally coded signal 103, developed on a bus BUS, and generates a pulse-width modulated signal PWM. Signal PWM has a controllable duty cycle that is selected from a range of values. The duty cycle is selected in accordance with the value of signal 103. For example, a change in a least significant bit of signal 103 produces a corresponding change in the duty cycle of signal PWM. Signal PWM is coupled to a base electrode of a non-committed or open collector transistor Q3. Transistor Q3 switches with a duty cycle that is equal to that of signal PWM.

In accordance with an inventive feature, the collector of transistor Q3 is coupled to inverting input terminal 104 of amplifier U1 via a series arrangement of a pull-up resistor R9 and a pull-up resistor R8. The voltage at input terminal 104 is a positive, constant DC voltage. Thus, advantageously, no additional pull-up resistor is required. In this way the circuit is simplified.

A small capacitor C1, coupled between resistors R8 and R9 acts, together with resistors R8 and R9, as a low-pass filter for current components at the harmonics of the switching frequency of transistor Q3 of a current i1. Current i1 flows in resistor R9 and in terminal 104. Capacitor C1 is small. Therefore, advantageously, any charge that is stored in capacitor C1 can have only a negligible effect on the average value of current i1. Because voltage V3 is a constant DC voltage, the peak-to-peak amplitude of toggling current i1 is the same for any selected duty cycle.

In accordance with another inventive feature, by eliminating any significant reactive element such as a large capacitor from the current path of current i1, the average value of current i1 becomes linearly dependent on the duty cycle of transistor Q3. The result is that, for a given change in digitally coded signal 103, compensation current iW1 in coil W1 changes by the same amount regardless of the value of signal 103 prior to the change. Thereby, advantageously, linear operation is obtained.

What is claimed is:

1. A video display apparatus for controlling a beam landing location in a cathode ray tube, comprising:
    a transducer for producing a beam controlling field in said cathode ray tube;
    a transistor switch having a controllable duty cycle;
    an amplifier having an output coupled to said transducer for producing said beam controlling field;
    a feedback network coupled to said output of said amplifier and to a first input of said amplifier for controlling an input voltage at said first input; and
    a pull-up resistor coupled to a main current conducting terminal of said transistor switch and to said first input of said amplifier for applying said first input voltage to said resistor to generate in said resistor a toggling current having a duty cycle that is controlled by said transistor switch and an amplitude that is controlled by said input voltage.

2. An apparatus according to claim 1 further comprising, a filter coupled to said resistor for filtering out current components at harmonics of a switching frequency of said transistor switch.

3. An apparatus according to claim 1 wherein a current in said transistor switch is produced at least predominantly from said toggling current.

4. An apparatus according to claim 1 wherein said transducer comprises a winding mounted on a neck of said cathode ray tube.

5. An apparatus according to claim 4 wherein said winding comprises a Z-axis winding.

6. An apparatus according to claim 1 wherein said input voltage is substantially a DC, constant voltage.

7. An apparatus according to claim 1 wherein said main current conducting terminal is non-committed.

8. An apparatus according to claim 1 wherein a reference signal is coupled to a second input of said amplifier and said amplifier controls said first input voltage in accordance with said reference signal.

9. An apparatus according to claim 8 wherein said first input comprises an inverting input of said amplifier and said second input comprises a non-inverting input of said amplifier.

10. An apparatus according to claim 9 wherein said transducer comprises a winding having a first terminal coupled to said amplifier output, wherein a voltage at said output of said amplifier is at the same polarity of a voltage at said non-inverting input of said amplifier, throughout an entire range of duty cycle of said toggling current, and wherein a second terminal of said winding is coupled to a source of a voltage intermediate a minimum and a maximum level of said amplifier output voltage.

11. An apparatus according to claim 1 wherein an amplitude of said toggling current is independent of said duty cycle.

12. A video display apparatus for controlling a beam landing location in a cathode ray tube, comprising:
    a transducer for producing a beam controlling field in said cathode ray tube;
    a transistor switch having a controllable duty cycle;
    an amplifier having an output coupled to said transducer for producing said beam controlling field, said amplifier having a feedback network for stabilizing a voltage at a first input; and
    a pull-up toggling coupled to an output terminal of said transistor switch and supplying to said first input a toggling current having a duty cycle controlled by said transistor switch.

13. An apparatus according to claim 12 wherein said toggling current has an amplitude that is independent of said duty cycle.

14. An apparatus according to claim 12 further comprising, a filter coupled to said resistor for filtering out current components at harmonics of a switching frequency of said transistor switch.

15. An apparatus according to claim 12 wherein a current in said transistor switch is produced at least predominantly from said toggling current.

16. An apparatus according to claim 12 wherein said transducer comprises a winding mounted on a neck of said cathode ray tube.

17. An apparatus according to claim 16 wherein said winding comprises a Z-axis winding.

18. An apparatus according to claim 12 wherein said input voltage is substantially a DC, constant voltage.

19. An apparatus according to claim 12 wherein a reference signal is coupled to a second input of said amplifier and said amplifier controls said first input voltage in accordance with said reference signal.

* * * * *